US006720566B2

(12) United States Patent
Blandford

(10) Patent No.: US 6,720,566 B2
(45) Date of Patent: Apr. 13, 2004

(54) SHUTTER FOR USE WITH A LIGHT SOURCE

(75) Inventor: Robert Michael Blandford, Edgewater, MD (US)

(73) Assignee: Miltec Corporation, Stevensville, MD (US)

(*) Notice: Subject to any disclaimer, the term of this patent is extended or adjusted under 35 U.S.C. 154(b) by 40 days.

(21) Appl. No.: 10/224,549

(22) Filed: Aug. 20, 2002

(65) Prior Publication Data

US 2004/0037081 A1 Feb. 26, 2004

(51) Int. Cl.[7] .................................................. G01J 1/00
(52) U.S. Cl. ............................... 250/504 R; 250/505.1; 362/321; 362/346; 362/347
(58) Field of Search ........................... 250/504.1, 503.1, 250/505.1; 362/341, 346, 347, 321

(56) References Cited

U.S. PATENT DOCUMENTS

| | | | | |
|---|---|---|---|---|
| 3,819,929 A | | 6/1974 | Newman | |
| 3,914,594 A | * | 10/1975 | Helding | 362/218 |
| 4,025,795 A | * | 5/1977 | Lackore et al. | 250/504 R |
| 5,861,633 A | | 1/1999 | Mandellos | |
| 6,191,428 B1 | | 2/2001 | Gilberti | |

* cited by examiner

*Primary Examiner*—Jack Berman
(74) *Attorney, Agent, or Firm*—Dority & Manning, P.A.

(57) ABSTRACT

A shutter for use with a light source is provided. The shutter includes a first section that has an inner receiving surface for receiving at least part of a reflector liner. A second section is present and has an inner receiving surface for receiving at least part of the reflector liner. The second section is removably securable to the first section. The sections cooperate to provide adequate force to the reflector liner to cause the reflector liner to be retained on the inner receiving surfaces between engaging projections on the sections during attachment between the first and second sections. Detachment of the second section from the first section allows for the removal of the reflector liner from the receiving surfaces.

23 Claims, 7 Drawing Sheets

SHUTTER FOR USE WITH A LIGHT SOURCE

BACKGROUND

Light energy irradiators find many applications in manufacturing, universities, research facilities, and in the medical field. Irradiator systems are commonly powered by medium pressure mercury vapor lamps which are sometimes referred to in the art as arc lamps, ultraviolet (UV) lamps, cal rods, or UV curing systems. These systems have a wide range of uses and can be used, for example, in the curing of polymers such as photo polymer paints, the curing of inks and coatings, photo activation of adhesives, production of compact discs, and in photo resistant activation. A UV lamp produces high intensity radiation energy in the UV, visible, and infrared spectrums. This high intensity radiation energy may be used to cure inks, coatings, and adhesives that are applied to a variety of substrates, such as paper, plastic film, wood, and metal. The UV lamp or other light source that is used in these processes is typically supported next to a reflecting surface. The reflecting surface is configured in order to provide either a focused or a non-focused reflection of the light. Typically, when the apparatus is used for the curing of materials, the reflector surface will have an elliptical profile to provide a focused optical configuration. Here, the light energy is concentrated into a narrow beam on the curing surface. Typically, elliptical reflectors are used in curing photo reactive fast moving films and webs and printing inks on paper and plastic film that are carried on a conveyor.

The reflecting surface may also be configured to have a semi-circular or parabolic profile. Such a profile provides for a non-focused optical configuration of the reflected light from the light source. Such an optical configuration may be used in applications seeking to cure thicker or slower moving films such as adhesives.

A mechanical shutter is one common feature found in most high-powered light energy irradiators. The purpose of a mechanical shutter is to serve as a light-blocking device to prevent light from the UV lamp from reaching the substance that is being cured. When the shutter is in a closed position, it contains the radiation energy within the lamp housing to prevent energy exposure to the substrate and the material to be cured. In a common production process, the mechanical shutter will typically close when the production machine stops, in order to prevent thermal damage to the substrate. The mechanical shutter will open when the machine starts production, which therefore allows for complete exposure of the UV light to the UV curable material applied to the substrate that is moving under the UV light source.

Generally, two types of mechanical shutters are used in light energy irradiators. The first type is a rotating shutter. A rotating shutter is typically made of one piece of metal, usually aluminum due to its excellent conductivity. In order to close the shutter, the shutter simply rotates in front of the UV lamp to block the light from the substrate and the material to be cured. A rotating shutter is typically water-cooled to prevent thermal damage to the UV lamp system and the material being cured. However, some of the shutters may be air-cooled.

A second type of shutter is commonly referred to as a "clam shell" type shutter. This is so because the shutter is configured to open and close much like a clam shell. The shutter is constructed of two halves that are mirror images of one another and are mounted around the UV lamp. Each half of the shutter pivots around a strategically located pivot pin. When the shutter pivots to its closed position, it completely isolates the UV light within its closed cavity. This of course blocks the light from the substrate and the material to be cured. The shutter may also pivot to its open position to allow for UV light to be imparted onto the substrate and the material to be cured. These types of shutters are typically air-cooled.

Reflector sheets which are typically polished aluminum are mounted inside of the mechanical shutter in order to provide for the proper reflection of light energy from the UV lamp. A significant problem with reflector sheets are that the surface deteriorates over time, decreasing the performance of the light energy irradiator system. Additionally, these reflector sheets are difficult to replace. Current shutters make use of one or more rails along either the whole, or partial length of the shutter to retain the reflector sheets thereon. One way of replacing reflector sheets is to slide the entire reflector sheet out from one piece of the mechanical shutter. Such a procedure is problematic in that, aside from being a slow and difficult process, the new elongated reflector sheet when being slid back into the mechanical shutter may become slightly bent or may allow for air to be trapped between the reflector sheet and the mechanical shutter. In operation after having been replaced, heat from the light source will cause a warping of the reflector sheet due to the air being present between the reflector sheet and the mechanical shutter. Such warping will negatively impact the reflective condition of the reflector sheet resulting in decreased performance of the light energy irradiator system.

FIG. 7 shows a prior art shutter 110. Here, the shutter 110 is housed within a lamp housing 106. The reflector liner 20 is attached to a shutter section 102. This attachment is facilitated by way of a retaining clip 100 which attaches the shutter section 102 and the reflector liner 20.

The current state of the art employs UV lamp systems that have replaceable reflector liners 20 that are removed by disassembling a side of the lamp housing 106 and sliding the reflector liner 20 into a top and bottom retaining groove in a shutter 110 which is normally a very snug fit. This snug fit makes it difficult to slide the reflector liner 20 into position. In some instances, sliding friction can be so high as to cause the reflector liner 20 to bend as it is being forced into position. Such bending will negatively impact the reflector liner's 20 ability to reflect light energy. Additionally, it will also cause air gaps between the reflector liner 20 and the shutter 110 which consequently reduces heat transmission from the reflector liner 20 into the shutter 110. These air gaps can cause the reflector liner 20 to over heat and warp during lamp operation which will subsequently negatively impact the reflective ability of the reflector liner 20, reduce the light output of the UV lamp system, reduce the life of the reflector liner 20, and could possibly cause the UV lamp system to overheat and impact the life of the lamp. On the other hand, if the reflector liner 20 is cut too small and fits too loosely within the grooves in the shutter, the liner 20 will not properly fit against the shutter 110 which may also cause air gaps between the reflector liner 20 and the shutter 110 and hence produce the same negative results as previously stated.

As shown in FIG. 8, the retaining clip 100 may be attached by the use of a screw 104. One or more retaining clips 100 may be employed along the length of the prior art shutter 110 as shown in FIG. 9. Here, three retaining clips 100 are employed on one section of the prior art shutter 110 and four retaining clips 100 are employed along the length of another section of the prior art shutter 110. The retaining clips 100 are mounted every few inches along the length of the prior art shutter 110, and are not continuous along the length of the prior art shutter 110. As shown in FIG. 7, such a configuration does not prevent the occurrence of air gaps between the reflector liner 20 and the shutter section 102 hence resulting in a warped area 98 of the reflector liner 20. Further, the retaining clips 100 do not help conform the reflector liner 20 to the shape of the shutter section 102, but only help to retain the reflector liner 20 onto the shutter section 102. Since the retaining clip 100 does not force the reflector liner 20 to conform to the elliptical shape of the shutter section 102, the potential for air gaps and warpage of the reflector liner 20 is not eliminated.

Although shown as having multiple retaining clips 100, prior devices have been designed having one single, continuous retaining clip 100. Other problems in prior art shutters exist in the fact that the shutter must be completely removed from the lamp housing in order to remove and/or replace the reflector liners.

SUMMARY

The present invention improves upon previous light energy irradiators by providing for an improved shutter that allows for a reflector liner to be easily removed and replaced. The present invention also provides for the replacement of the reflector liner in which warping of the reflector liner is not present once operation of the light energy irradiator begins.

Various features and advantages of the invention will be set forth in part in the following description, or may be obvious from the description, or may be learned from practice of the invention. The present invention provides for a shutter that is used in controlling light from a light source. The shutter includes a first section, that has an engaging member, and that has an inner receiving surface for receiving at least part of a reflector liner. A second section, also with an engaging member, is present and also has an inner receiving surface. The second section is removably securable to the first section. The sections cooperate to provide adequate force to the reflector liner to cause the reflector liner to be retained on the inner receiving surfaces between the engaging projections during attachment of the first and second sections. Detachment of the second section from the first section allows for the removal of the reflector liner from the receiving surfaces.

The shutter of the present invention may be either a rotatable shutter or a clam shell shutter. Further, the shutter may be made of aluminum and may be formed by extrusion. A plurality of fins may be disposed on one or more of the sections in order to dissipate heat that is transferred from the light source.

The present invention also provides for a shutter as described above where one of the first or second sections has a male tapered groove that mates with a female tapered groove located on the other of the first or second sections. This mating occurs when the first and second sections are attached to one another and makes the two sections self-aligning when attached together, for example when bolted to one another. The male and female taper also help insure that the reflector liner is held in position with the correct amount of pressure and that a desired shape of the reflector liner is correctly formed and sustained. In an alternative exemplary embodiment to the present invention, the male and female tapered grooves extend along the entire length of the first and second sections. Such an arrangement helps to insure a mechanical hold between the two sections along the entire length of the shutter to help prevent warping.

A plurality of apertures may be present on the first or second section in order to provide for a pivot point of the mechanical shutter. The apertures may be sized and placed so that the shutter is retrofitable into existing UV lamp systems.

An alternative exemplary embodiment of the present invention exists in a shutter as described above where the reflector liner is attached against the inner receiving surfaces such that the potential for air gaps between the reflector liner and the inner receiving surfaces is eliminated. Such an arrangement may be made in which the first and second sections receive the reflector liners in matingly flush engagement along the entire length of the first and second sections.

A further exemplary embodiment exists in a shutter disposed in a lamp housing that includes a first section and a second section. The first section has a receiving surface onto which a reflector liner may be retained through attachment of the second section to the first section. The reflector liner may be replaced without having to remove the first and second sections from the lamp housing.

DETAILED DESCRIPTION OF PREFERRED EMBODIMENTS

Figure 1:
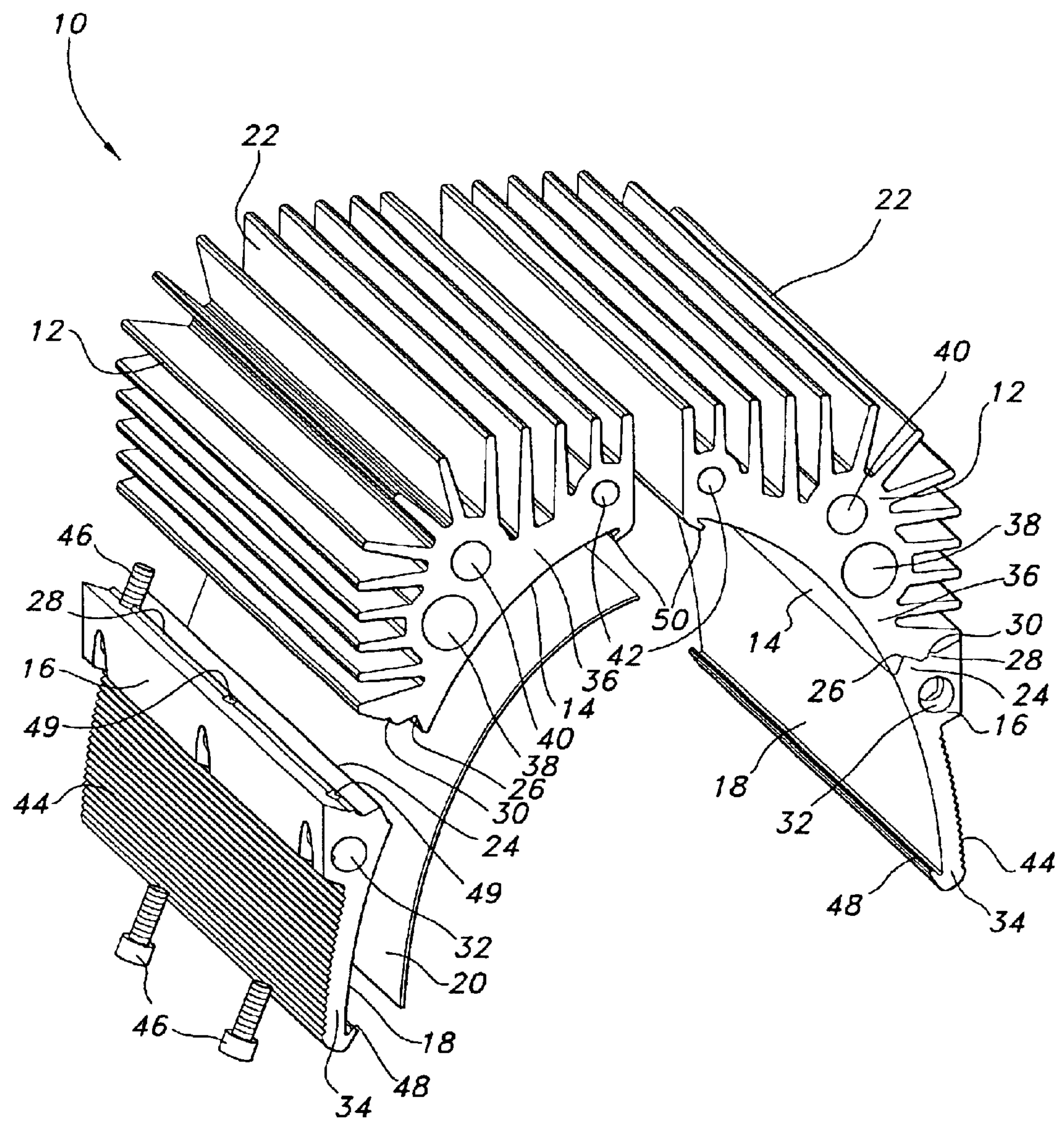
FIG. 1 is an exploded assembly view of an exemplary embodiment of a shutter of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention included these and other modifications and variations.

Referring now to the drawings, FIG. 1 shows an exemplary embodiment of a shutter 10 in accordance with the present invention. The shutter 10 may be designed for use in ultra violet curing lamp systems. Additionally, the shutter 10 may be designed such that it may be directly retrofitted into an existing number of lamp systems. One such use of the shutter 10 is in medium pressure mercury vapor lamp systems. These types of systems are sometimes known as arc lamps, ultra violet (UV) lamps, or UV curing systems. The shutter 10 may be composed of four extruded pieces of aluminum. Each half of the shutter 10 includes two pieces, those being a first section 12 and a second section 16. The shutter 10 may be made of any material or combination of materials in other exemplary embodiments of the present invention and is not limited to being simply aluminum.

A reflector liner 20 may be retained upon both the first and second sections 12 and 16. The reflector liner 20 redirects light from a light source (not shown in FIG. 1) to a desired location. Only one reflector liner 20 is shown in FIG. 1 for purposes of clarity. The reflector liner 20 may be placed onto an inner receiving surface 14 of the first section 12, and be inserted into a first lip 50 located on the first section 12. The second section may be positioned such that the reflector liner 20 contacts an inner receiving surface 18 of the second section 16. The reflector liner 20 may also be retained within a second lip 48 located on the second section 16. Attachment of the second section 16 to the first section 12 causes the reflector liner 20 to be retained on the inner receiving surfaces 14 and 18 of the first and second sections 12 and 16. The attachment point between the first section 12 and the second section 16 is located in such a position that the reflector liner 20 may be removed and replaced or substituted into the shutter 10 without having to remove the first section 12 from the UV lamp housing and/or to disassemble the first section 12.

The second section 16 is removable from the first section 12. Therefore, a user may position the reflector liner 20 against the inner receiving surface 14 and into the first lip 50. Also, the reflector liner 20 may be properly positioned against the inner receiving surface 18 of the second section 16 and placed into the second lip 48 upon attachment of the second section 16 to the first section 12. This type of an arrangement precisely and correctly captivates the reflector liner 20 due to the precise connection attachment between the first and second sections 12 and 16. Forces from the first and second lips 50 and 48 are imparted onto the reflector liner 20 through engagement of the first and second sections 12 and 16. These forces in turn act to hold the reflector liner 20 onto the inner receiving surfaces 14 and 18. As such, this arrangement may be a tight fitting relationship in which the reflector liner 20 cannot be slid off of the inner receiving surfaces 14 and 18. In this case, removal can only be effected by disengagement of the first section 12 and the second section 16.

As shown in FIG. 1, the second section 16 is provided with a series of bolt holes 49. A corresponding set of bolt holes (not shown) is present on the first section 12. Clamping bolts 46 may be inserted through the bolt holes 49 in order to properly attach the first and second sections 12 and 16 to one another. The clamping bolts 46 are accessible without removing the shutter 10 from the UV light system. In other exemplary embodiments of the present invention, the use of a bolt attachment is not needed. For instance, according to other exemplary embodiments of the present invention first section 12 and second section 16 may be attached to one another through any number of means commonly known in the art, for instance, clips, ties, screws, or an adhesive may be used.

Shutter 10 may be configured such that the reflector liner 20 may be removed and/or replaced while the shutter 10 is in the operating position inside of the lamp housing. Such a configuration allows for easier and less time consuming replacement of the reflector liner 20.

The use of the first section 12 and the second section 16 helps to prevent the reflector liner 20 from being bent or damaged during installation. If the reflector liner 20 were so damaged, it may be the case that a small amount of air is caught between the reflector liner 20 and one of the receiving surfaces 14 or 18. During use, the surface of the reflector liner 20 becomes hot due to the energy output of the light source (not shown). This heat will then be transferred through conduction into the first and second sections 12 and 16. Additionally, heat from the reflector liner 20 will be transferred through convention through the air pocket caused by the damaged reflector liner 20 into the first or second sections 12 or 16. This uneven heating will cause a varying degree of thermal expansion and results in further damaging or warping of the reflector liner 20. Such a damaged reflector liner 20 is not capable of properly reflecting light energy from the light source (not shown). As such, the efficiency of the shutter 10 is reduced. The use of the first section 12 and second section 16 ensures adequate surface contact between the reflector liner 20 and the inner receiving surfaces 14 and 18. This maximizes heat conduction between the aforementioned elements which enhances cooling of the reflector liner 20 and the shutter 10 and helps to prevent potential warping due to thermal expansion.

A secure fit between the first section 12 and the second section 16 also helps to conform the reflector liner 20 into the shape of the shutter 10, for instance a semi-elliptical shape as shown in FIG. 1. A proper shape of the reflector liner 20 helps to maintain a desired reflective pattern in the UV curing lamp system. The first section 12 is provided with a series of fins 22 on one end thereof. One purpose of the fins 22 is to provide for an increased surface area of the first section 12 in order to more efficiently dissipate heat that is transferred to the first section 12. However, it is to be understood in other exemplary embodiments of the present invention, other forms of heat dissipation may be employed. Additionally, the use of the fins 22 may provide for a more robust design of the first section 12. The second section 16 is provided with a contoured surface 44. The contoured surface 44 may also aid in the dissipation of heat from the second section 16. Again, other forms of heat dissipation may or may not be employed in the construction of the second section 16 in other exemplary embodiments of the present invention.

A male tapered groove 24 is present on one end of the second section 16. A corresponding female tapered groove 26 is present on an end of the first section 12. Additionally, a second male tapered groove 28 is present on the second section 16 with a corresponding second female tapered groove 30 being present on the first section 12. The first set of grooves 24 and 26 mate with one another as do the second set of grooves 28 and 30 during attachment of the first section 12 to the second section 16. These grooves help ensure that the first and second sections 12 and 16 are self-aligning when joined together. A proper and precise alignment of the first and second sections 12 and 16 is attained upon attachment. Additionally, these grooves 24, 26, 28, and 30 help ensure that the reflector liner 20 is held in position with a predetermined amount of pressure each time a new reflector liner 20 is installed. Also, grooves 24, 26, 28, and 30 help to ensure that the proper shape of the reflector liner 20 is achieved upon connection of the first and second sections 12 and 16. Further, grooves 24, 26, 28, and 30 help to provide for a mechanical securement between the two sections 12 and 16 along the entire length of the shutter 10. Such a securement will also help to prevent warping of the reflector liner 20.

It is to be understood that in other exemplary embodiments of the present invention, the grooves 24, 26, 28, and 30 may or may not be employed. Further, in some exemplary embodiments of the present invention, only the grooves 24 and 26 may be employed, those embodiments eliminating the grooves 28 and 30. Although, shown as having a triangular cross section in FIG. 1., it is to be understood that in other exemplary embodiments of the present invention that the grooves 24, 26, 28, and 30 may have cross sections of varying shapes. Additionally, the grooves 24, 26, 28, and 30 do not have to be located along the entire length of the shutter 10, but may be located along various lengths of the shutter 10.

A first aperture 32 is present on an end surface 34 of the second section 16. Additionally, a second aperture 38, a third aperture 40, and a fourth aperture 42 are present on an end surface 36 of the first section 12. Apertures 32, 38, 40, and 42 may be present in order to allow for a pivot point in order to permit the shutter 10 to pivot. The apertures 32, 38, 40, and 42 may extend through the entire length of the shutter 10 or may only extend partially through the shutter 10. Additional corresponding apertures may be included on an end opposite from the end surfaces 34 and 36 if the apertures 32, 38, 40, and 42 do not extend through the entire length of the shutter 10. These additional apertures are not shown in FIG. 1.

The preferred embodiment of the present invention exists in a shutter 10 having the first and second section 12 and 16, each section having the engaging projections 50 and 48 thereon. Force due to attachment of the sections 12 and 16 causes the reflector liner 20 to be retained on the inner receiving surfaces 14 and 18. This force also causes the reflector liner 20 to be conformed onto the inner receiving surfaces 14 and 18 such that one side of the liner 20 takes the shape of the surfaces 14 and 18. Disengagement of the sections 12 and 16 allows for the reflector liner 20 to be removed from the shutter 10.

Figure 2A:
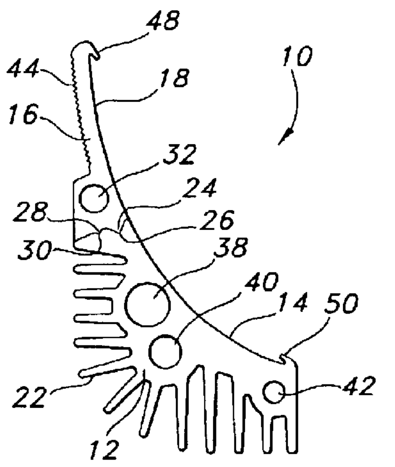
FIG. 2A is a side elevation view of an exemplary embodiment of a shutter in accordance with the present invention.
Figure 2B:
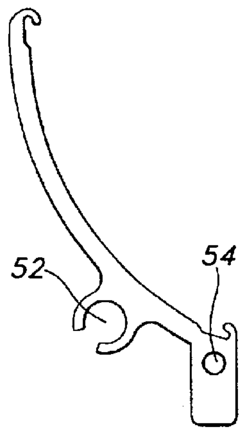
FIG 2B (PRIOR ART)
FIG. 2B is a side elevation view of a prior art shutter referred to as shutter 2B in the detailed description section.

FIG. 2A shows a side elevation view of the first section 12 attached to the second section 16 forming the shutter 10. By providing a series of apertures 32, 38, 40 and 42, it is possible for the shutter 10 of the present invention to be retrofitted into existing UV lamp systems. For instance, a UV lamp system that incorporates the shutter shown in FIG. 2B has apertures 52 and 54 being present. These apertures 52 and 54 correspond to the third aperture 40 and the fourth aperture 42 respectively of the exemplary embodiment of the present invention shown in FIG. 2A. It is therefore possible to substitute the shutter 10 shown in FIG. 2A into the UV lamp system employing the shutter shown in FIG. 2B because the pivot points correspond between the two shutters. Further, the size and shape of the shutter 10 in an exemplary embodiment of the present invention is sized so that it may fit into UV lamp systems that are manufactured by different suppliers.

Figure 2C:
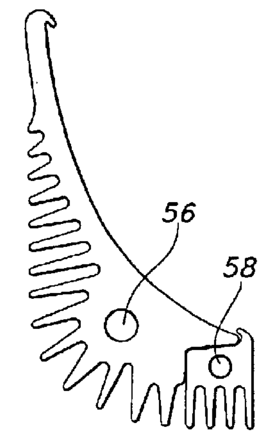
FIG 2C (PRIOR ART)
FIG. 2C is a side elevation view of a prior art shutter referred to as shutter 2C in the detailed description section.

Additional configurations of shutters are shown in FIG. 2C through FIG. 2F. FIG. 2C shows a shutter having an aperture 56 and aperture 58. The third aperture 40 (FIG. 2A) corresponds to the aperture 56, and the fourth aperture 42 of the embodiment shown in FIG. 2A corresponds to the aperture 58 shown in the shutter of FIG. 2C. As such, the shutter 10 of the present invention may substitute for the shutter shown in FIG. 2C. The shutter in FIG. 2C has a section that has a lip thereon, this section separate from the main section of the shutter. Disassembly of these two sections is problematic because the attachment point is located deep within the UV lamp assembly. By contrast, the attachment point of the sections 12 and 16 of the instant invention resides away from the deep interior of the UV lamp assembly and is in an easily accessible location. As such, less time is needed for replacement of the reflector liner 20.

Figure 2D:
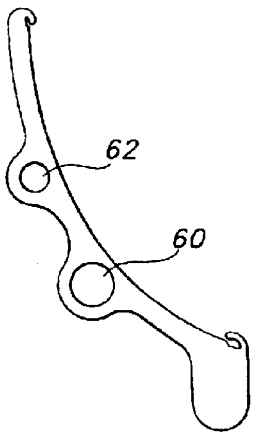
FIG 2D (PRIOR ART)
FIG. 2D is a side elevation view of a prior art shutter referred to as shutter 2D in the detailed description section.

FIG. 2D shows a shutter in an existing UV lamp system that has apertures 60 and 62 being located on one end thereof. The first aperture 32 of the present invention corresponds to the aperture 62 shown in FIG. 2D. Additionally, the second aperture 38 of the present invention corresponds to the aperture 60 shown in FIG. 2D. As such, the shutter shown in FIG. 2D may be replaced with the shutter 10 of the present invention.

Figure 2E:
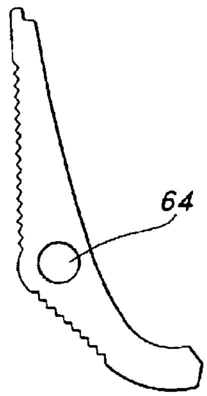
FIG 2E (PRIOR ART)
FIG. 2E is a side elevation view of a prior art shutter referred to as shutter 2E in the detailed description section.
Figure 2F:
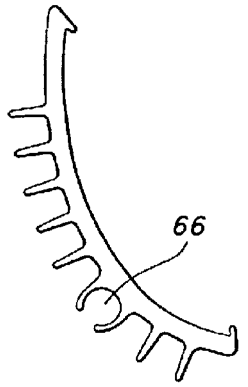
FIG 2F (PRIOR ART)
FIG. 2F is a side elevation view of a prior art shutter referred to as shutter 2F in the detailed description section.

FIG. 2E shows a side elevation view of a shutter having a single aperture 64 located on one end thereof. The aperture 64 corresponds to the second aperture 38 of the shutter 10 of the present invention. The shutter shown in FIG. 2E may be substituted with the shutter 10 of the present invention due to the corresponding second aperture 38 and to the general size and shape of the shutter 10. Additionally, FIG. 2F shows another shutter design having an aperture 66 being located thereon. The third aperture 40 of the shutter 10 of the present invention corresponds to the aperture 66 of the shutter shown in FIG. 2F. As such, the shutter 10 of the present invention may be substituted for the shutter shown in FIG. 2F.

As can be seen, providing the shutter 10 with a series of apertures 32, 38, 40, and 42 allows for the shutter 10 of the present invention to be retrofittable into a number of different existing UV lamp systems. However, it is to be understood that in other exemplary embodiments of the present invention, any number of, or no apertures may be present on the end surfaces 34 and 36 of the shutter 10. In these instances, the shutter 10 may or may not be retrofittable into existing UV lamp systems.

Figure 3:
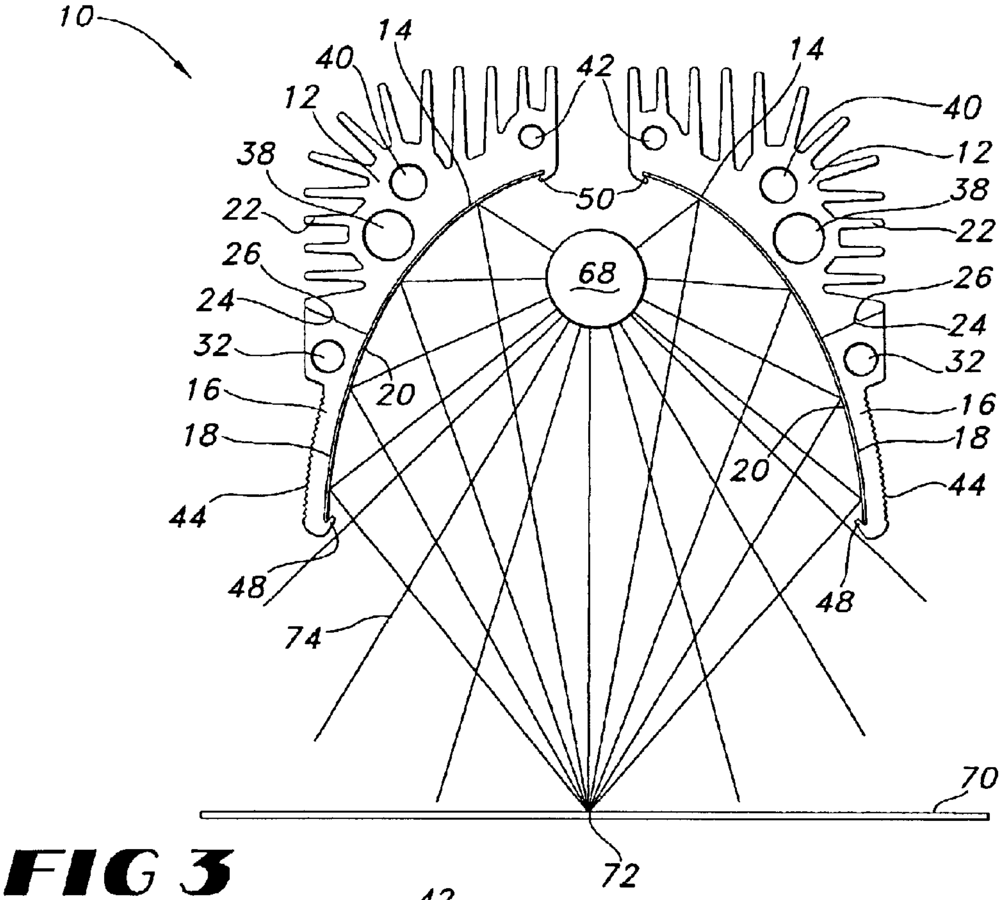
FIG. 3 is a side elevation view of an exemplary embodiment of a shutter in accordance with the present invention. The shutter is shown being disposed about a light source and having a substantially elliptical shape such that light energy is focused at a focal point on a substrate.

As can be seen in FIG. 3, the present invention utilizes a shutter 10 that is capable of receiving a reflector liner 20 in order to redirect light from a light source 68. The use of a reflector liner 20 is known in the art. UV lamp systems that do not employ the reflector liner 20 utilize a highly polished aluminum surface of the shutter that surrounds the UV lamp in order to reflect light emitted from the light source 68. This highly polished surface will eventually become oxidized and contaminated with dirt and other materials which reduces the reflectiveness and hence the energy transmission properties of the shutter. In this case, the shutter must be removed from the UV lamp system and cleaned using a sophisticated polishing technique. Such a polishing technique is undesirable in that it may take several hours in order to complete, subsequently causing a corresponding down time of the UV lamp system and a disruption to the manufacturing process.

The shutter 10 of the present invention significantly reduces maintenance time and cost when changing the reflector liner 20. The shutter 10 of the present invention will also extend the life expectancy of the reflector liner 20 by providing for a proper fitting of the reflector liner 20 to the first and second sections 12 and 16. Additionally, the shutter 10 of the present invention may be incorporated into existing UV lamp systems in order to help reduce the cost of running these systems.

FIG. 3 shows an exemplary embodiment of the shutter 10 in accordance with the present invention. Here, the shutter 10 is positioned around a light source 68. Light source 68 admits light energy 74 in a substantially 360° direction. A certain amount of the light energy 74 is bounced off of the reflective liner 20. Reflector liner 20 is semi-elliptical in shape such that the light energy 74 will be directed to a focal point 72 at a predetermined distance. This type of shutter arrangement 10 may be used in applications that require a concentrated amount of energy at a particular point. A substrate 70 may be hit with this concentrated energy at the focal point 72 and then moved after a predetermined amount of time.

Figure 4:
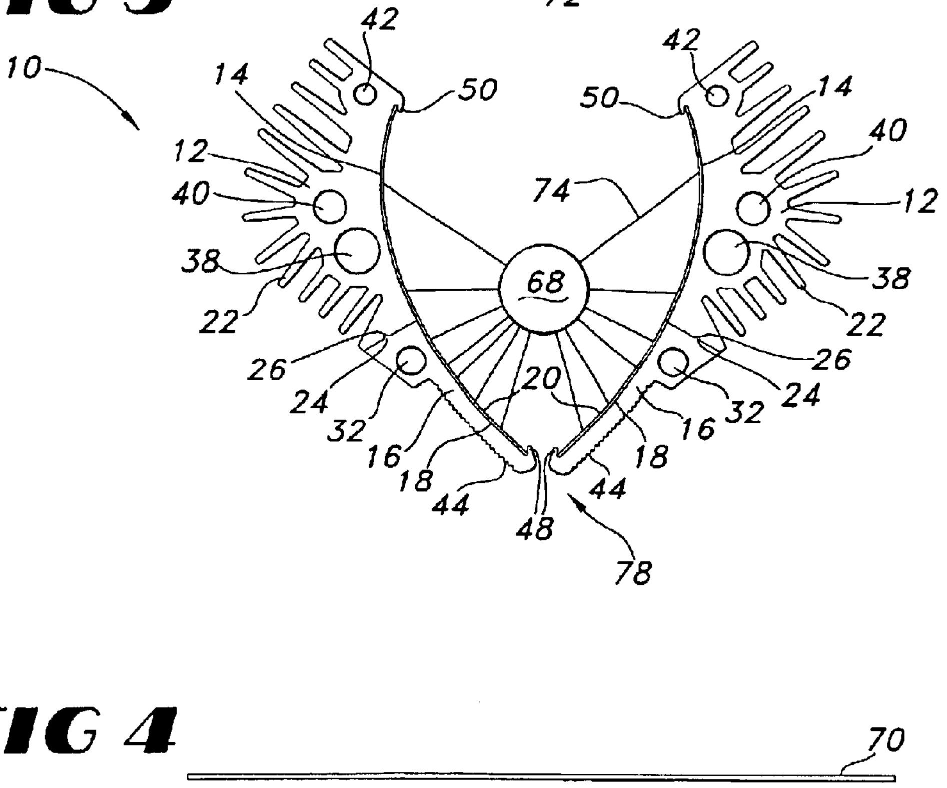
FIG. 4 is a side elevation view of the exemplary embodiment of the shutter shown in FIG. 3. The shutter is shown as being in the closed position.

FIG. 4 shows the exemplary embodiment of the shutter 10 of FIG. 3 in a closed position. Here, each pair of the first sections 12 and the second sections 16 are rotated such that a closed section 78 is formed proximate to the light source 68. The closed section 78 prevents light energy 74 from escaping the shutter 10 and contacting the substrate 70. The shutter 10 may be closed, for instance, when a remote disruption of the manufacturing process causes the process to be stopped. In this case, light energy 74 directed onto the substrate 70 would cause damage to the substrate 70 due to a prolonged exposure caused by the disruption to the manufacturing process. Closing the shutters 10 and hence forming the closed section 78 prevents this prolonged exposure and consequent damage to substrate 70. Pivotal rotation of the shutters 10 is accomplished by structure conventionally known in the art.

The shutter configuration shown in FIGS. 3 and 4 is sometime referred to as a clam shell shutter. This is because the closing of the shutter 10 as shown in FIG. 4 resembles that of a clam. In one exemplary embodiment of the present invention, a high-powered UV lamp is used as the light source 68. Here, 60% to 75% of the light energy 74 emitted from the UV lamp light source 68 is reflected by the reflector liner 20 to the substrate 70.

Figure 6:
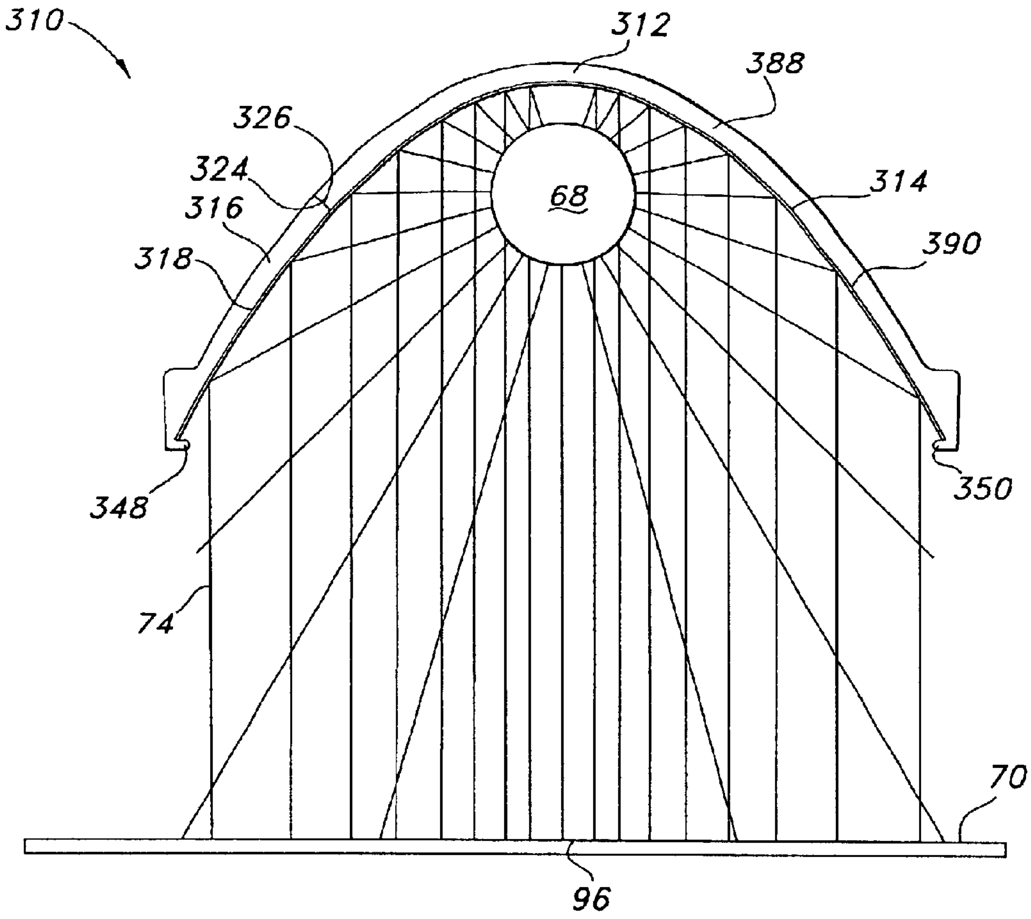
FIG. 6 is a side elevation view of a further exemplary embodiment of a shutter in accordance with the present invention. Here, the shutter is configured as being a parabolic shutter such that a substantially uniform amount of energy is directed towards a larger exposed area of a substrate.
Figure 7:
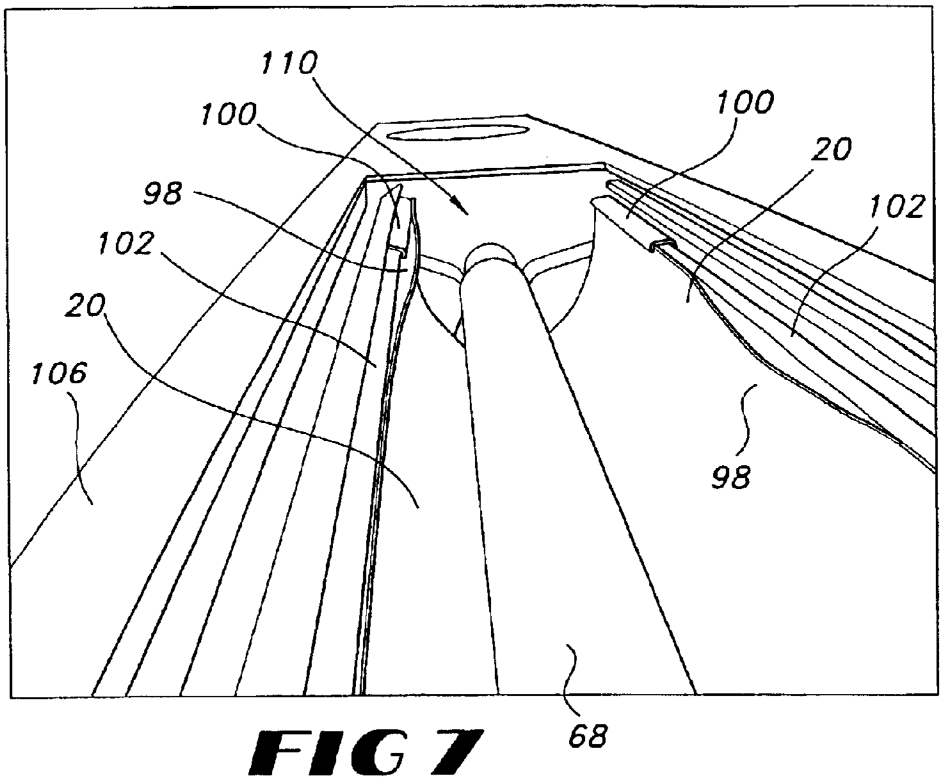
FIG 7 (PRIOR ART)
FIG. 7 is a perspective view of a prior art shutter being disposed in a lamp housing. The reflector liner is shown as having a warped area.
Figure 8:
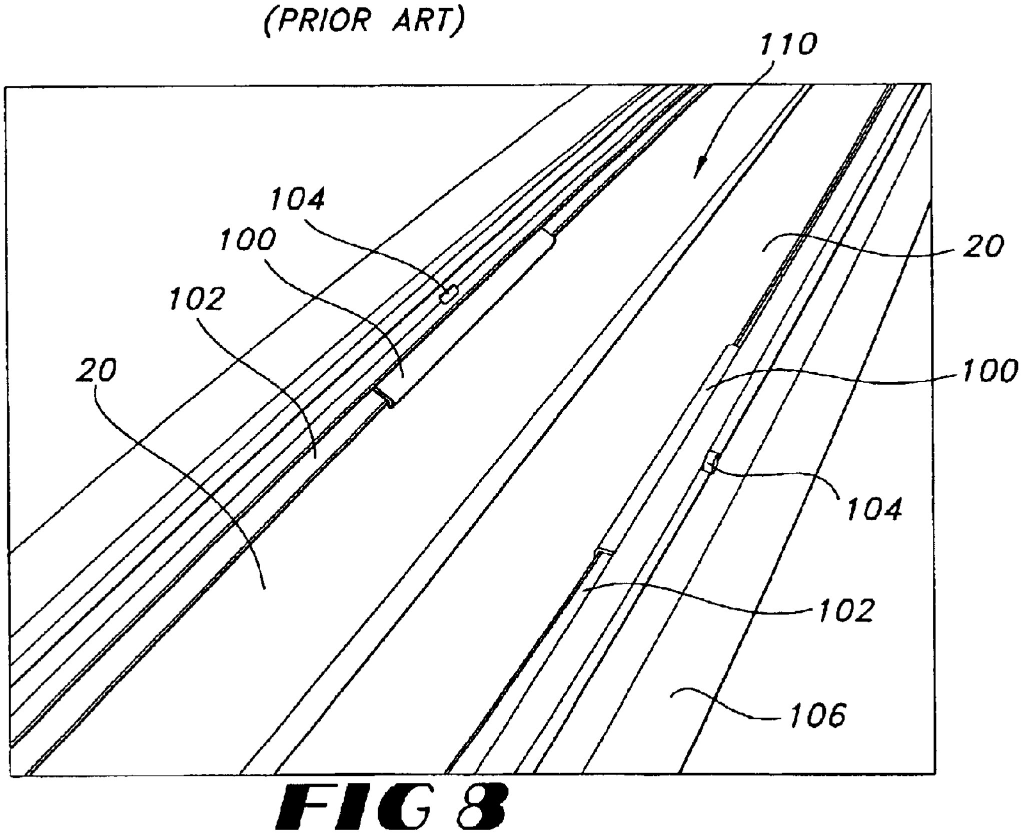
FIG 8 (PRIOR ART)
FIG. 8 is a perspective view of a prior art shutter. The reflector liner is shown as being held in place against the shutter by at least one retaining clip that is attached to the shutter with the use of a single screw.
Figure 9:
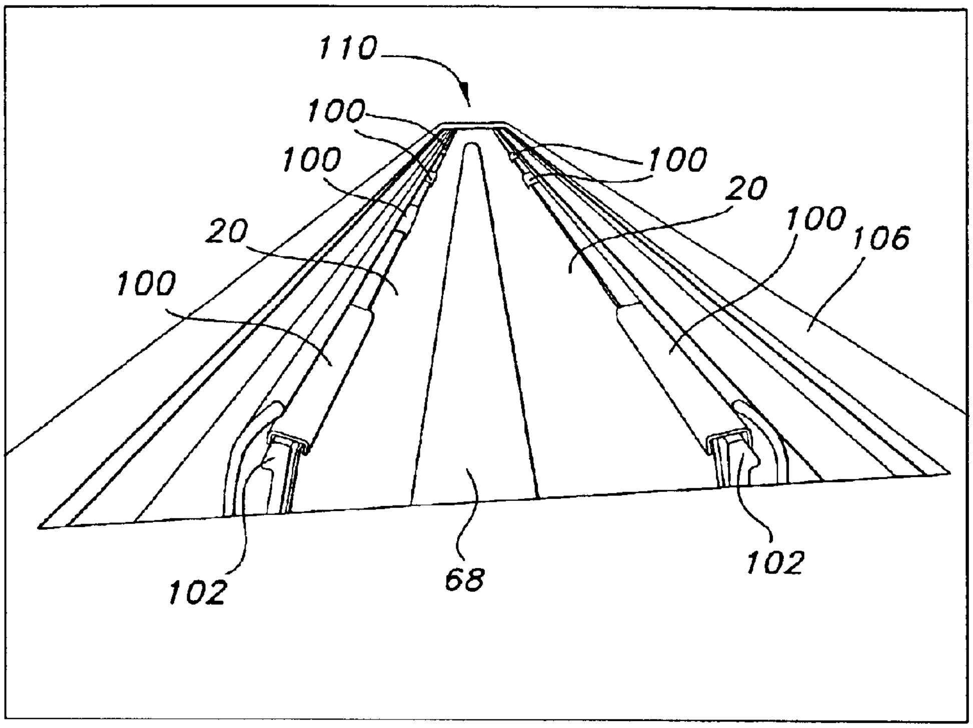
FIG 9 (PRIOR ART)
FIG. 9 is a perspective view of a prior art shutter. The reflector liner is held onto the shutter by a series of retaining clips disposed along the length of the shutter.

Having the shape of the reflector liner 20 being a semi-ellipse allows for the focal point 72 to be created. A high amount of energy is then concentrated at focal point 72 which allows for an enhanced cure time of the substrate 70. If lower levels of light energy 74 are desired over a wider surface, the shutter 10 may be de-focused from the substrate 70 by moving the UV lamp system away from the substrate 70. Alternatively, a parabolic shaped shutter 388 may be employed as shown in FIG. 6. Here, shutter 310 is a parabolic shutter 388 and is provided with a parabolic inner receiving surface 390 that is formed by the attachment of the first section 312 to the second section 316 such that the inner receiving surface 314 engages the inner receiving surface 318. The grooves 324 and 326 and the engaging projections 348 and 350 perform the same function as described above with respect to the exemplary embodiment in FIG. 1. The parabolic inner receiving surface 390 reflects the light energy 74 such that it is more uniformly dispersed across a larger exposed area 96 of the substrate 70.

Figure 5:
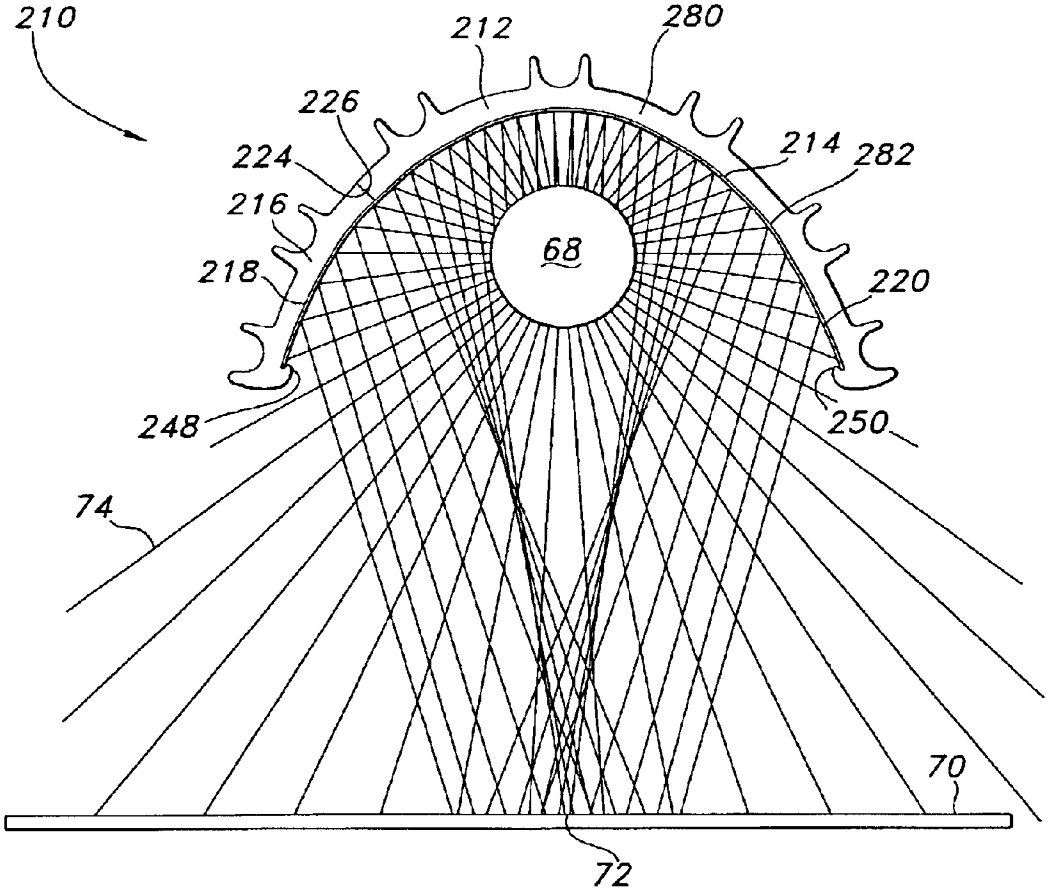
FIG. 5 is a side elevation view of a further exemplary embodiment of a shutter in accordance with the present invention. Here, the shutter is shown as being a rotating shutter that is capable of rotating 180° in order to block light from a light source from illuminating a substrate.

FIG. 5 shows the shutter 210 being a rotating shutter 280. Here, the rotating shutter 280 is provided with a semi-elliptical inner receiving surface 282. The semi-elliptical receiving surface 282 is formed by the convergence of the inner receiving surfaces 214 and 218.

The receiving surface 214 is located on a first section 212, and receiving surface 218 is located on a second section 216. The two sections 212 and 216 have a mating pair of grooves 226 and 224 in order to help maintain a constant alignment of the two sections 212 and 216. The reflector liner 220 is engaged on either end by engaging projections 248 and 250. The elliptical inner receiving surface 282 of the exemplary embodiment shown in FIG. 5 is shaped such that the light energy 74 is substantially focused at the focal point 72 on the substrate 70. However, the focal point 72 of the exemplary embodiment shown in FIG. 5 is not as focused as the focal point 72 shown in the exemplary embodiment of FIG. 3. It is to be understood that in various exemplary embodiments of the present invention, various shapes of the shutter 10 may be envisioned. These varying shapes allow for varying amounts of light energy 74 to be concentrated on the substrate 70. Additionally, the rotating shutter 280 is configured not to pivot as the clam shell shutter 10 of FIGS. 3 and 4, but is designed to rotate in front of the light source 68 such that the light energy 74 is prevented from contacting the substrate 70 due to the rotating shutter 280 being disposed therebetween. Rotation of the shutter 210 is accomplished by structure conventionally known in the art. Also, the shutters of the present invention may be simply stationary, and do not need to be rotated.

As the reflector liner 20 is contaminated with dirt or other foreign material, the reflectivity of the reflector liner 20 will be reduced. A dirtier reflector liner 20 will therefore reflect less light energy 74 onto the substrate 70. This results in a lower cure speed capability, or a total loss of cure of the substrate 70 if the machine operator does not compensate for the reduction in the light energy 74 by slowing down the machine speed. Obviously, such a loss of cure is costly to the manufacturing process because it produces scrap. Additionally, slowing down the machine speed is costly because it reduces production output.

Figure 10:
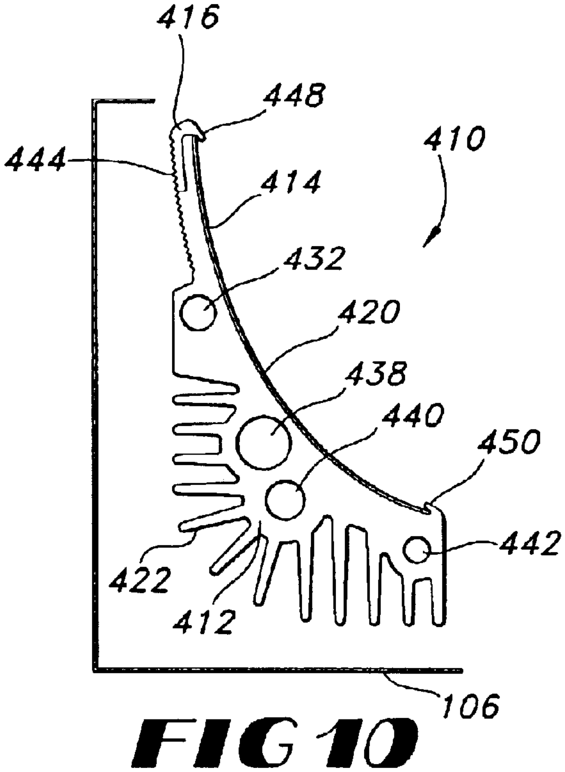
FIG. 10 is a further exemplary embodiment of a shutter in accordance with the present invention. Here, only one of the shutter sections is provided with a receiving surface.

Referring now to FIG. 10, an alternative exemplary embodiment of the present invention is shown. Here, the shutter 410 is again shown as having a first section 412 connected to a second section 416. However, while an inner receiving surface 414 is shown as being present, such a surface is not shown on the second section 416. As such, the reflector liner 420 will be retained upon the inner receiving surface 414 and not on any surface of the second section 416. However, the attachment point between the first section 412 and the second section 416 is placed such that the reflector liner 420 may be replaced without removing the shutter 410 from the lamp housing 106. Engaging projections 448 and 450; apertures 432, 438, 440, 442; fins 422; and contoured surface 444 functions as described above with respect to the embodiment shown in FIG. 1.

It should be understood that the present invention includes various modifications that can be made to the embodiments of the shutter for blocking light from a light source described herein as come within the scope of the depending claims and their equivalents.

What is claimed:

1. A shutter for use with a light source, comprising:

a first section having an inner receiving surface for receiving at least part of a reflector liner, said first section having an engaging projection located thereon; and a second section having an inner receiving surface for receiving at least part of the reflector liner, said second section having an engaging projection thereon, said second section being removably securable to said first section, wherein said sections cooperating to provide adequate force to the reflector liner to cause the reflector liner to be retained on said inner receiving surfaces between said engaging projections during attachment between said first and second sections, detachment of said second section from said first section allowing for the removal of the reflector liner from said receiving surfaces.

2. The shutter as set forth in claim 1, wherein said first and second sections form a rotating shutter.

3. The shutter as set forth in claim 1, further comprising another first section and second section being a mirror image of said first and second sections and forming a clam shell shutter.

4. The shutter as set forth in claim 1, wherein said first and second sections are made of aluminum and are formed by extrusion.

5. The shutter as set forth in claim 1, wherein at least said first section having a plurality of fins disposed thereon for dissipating heat transferred from the light source.

6. The shutter as set forth in claim 1, wherein one of said first and second sections having a male tapered groove mating with a female tapered groove located on the other of said first and second sections during attachment between said first and second sections.

7. The shutter as set forth in claim 6, wherein said male and female tapered grooves extend along the entire length of said first and second sections.

8. The shutter as set forth in claim 1, wherein a plurality of apertures are present on an end surface formed during attachment of said second section to said first section, at least one of said apertures being used as a pivot point about which said shutter is configured to pivot.

9. The shutter as set forth in claim 1, wherein said inner receiving surfaces of said first and second sections being semi-elliptical in shape.

10. The shutter as set forth in claim 3, wherein said inner receiving surfaces of said clam shell shutter being parabolic in shape.

11. The shutter as set forth in claim 1, wherein the reflector liner is attached against the inner receiving surfaces of the first and second sections such that the potential for air gaps between the reflector liner and the inner receiving surfaces is eliminated.

12. The shutter as set forth in claim 1, wherein said shutter is retrofittable into existing UV lamp systems.

13. The shutter as set forth in claim 1, wherein said first and second sections are configured such that said inner receiving surfaces receive the reflector liners in matingly flush engagement along the entire length of said first and second sections.

14. A shutter for use with a light source, comprising:

a pair of replaceable reflector liners;

a pair of first sections, each being the mirror image of the other, said first sections having an inner receiving surface for receiving at least part of one of said replaceable reflector liners, and said first sections each having an engaging projection located thereon;

a pair of second sections, each being the mirror image of the other, said second sections having an inner receiving surface for receiving at least part of one of said replaceable reflector liners, and said second sections each having an engaging projection located thereon, one of said second sections being removably securable to one of said first sections, and both being pivotable about a pivot point, and the other of said second sections being removably securable to the other of said first sections, and both being pivotable about another different pivot point; and wherein said sections cooperating to provide adequate force to said reflector liner to cause said reflector liner to be retained on said inner receiving surfaces between said engaging projections during attachment of said second sections to said first sections, and wherein detachment of said first sections from said second sections allowing for removal of said replaceable reflector liners from their respective first and second sections.

15. The shutter as set forth in claim 14, wherein said first and second sections are made of aluminum and are formed by extrusion.

16. The shutter as set forth in claim 14, wherein at least said first sections having a plurality of fins disposed thereon for dissipating heat transferred from the light source.

17. The shutter as set forth in claim 14, further comprising a male and female tapered groove arrangement located at the connection between one of said first and second sections, and another male and female tapered groove arrangement located at the connection between the other of said first and second sections.

18. The shutter as set forth in claim 17, wherein both of said male and female tapered groove arrangements extend along the entire length of both of said pairs of first and second sections.

19. The shutter as set forth in claim 14, wherein both of said pivot points being an aperture on the end surface of one of said attached first and second sections, and being an aperture on the end surface of the other of said attached first and second sections.

20. The shutter as set forth in claim 14, wherein said inner receiving surfaces of said first and second sections being semi-elliptical in shape, and wherein said replaceable reflector liners mating flush along their entire length against said first and second sections.

21. The shutter as set forth in claim 14, wherein said inner receiving surfaces of said first and second sections being parabolic in shape.

22. The shutter as set forth in claim 14, wherein said shutter is retrofitable into existing UV lamp systems.

23. A clam shell style shutter for use in blocking light from a UV light source, comprising:

a pair of first sections each being the mirror image of the other, said first sections having a semi-elliptical shaped inner receiving surface thereon, said first sections having a plurality of fins located thereon for dissipation of heat from the UV light source, said first sections having at least one aperture for use as a pivot point in order to allow said first sections to pivot at least partially about said UV light source;

a pair of second sections each being the mirror image of the other, said second sections having a semi-elliptical shaped inner receiving surface thereon, one of said second sections being removably securable to one of said first sections and the other of said second sections being removably securable to the other of said first sections;

a pair of replaceable reflector liners, one of said replaceable reflector liners being retained in and being matingly flush against said inner receiving surfaces of said attached first and second sections, and the other of said replaceable reflector liners being retained on and being matingly flush against said inner receiving surfaces of the other of said attached first and second sections; and a male and female tapered groove arrangement located at the connection between one of said attached first and second sections, and another male and female tapered groove arrangement located at the connection between the other of said attached first and second sections.

* * * * *